Sept. 11, 1962 R. W. COOK 3,053,170
CITRUS FRUIT PEEL SHREDDER
Filed Nov. 17, 1960 3 Sheets-Sheet 1

Ralph W. Cook
INVENTOR.

Sept. 11, 1962 R. W. COOK 3,053,170
CITRUS FRUIT PEEL SHREDDER
Filed Nov. 17, 1960 3 Sheets-Sheet 2
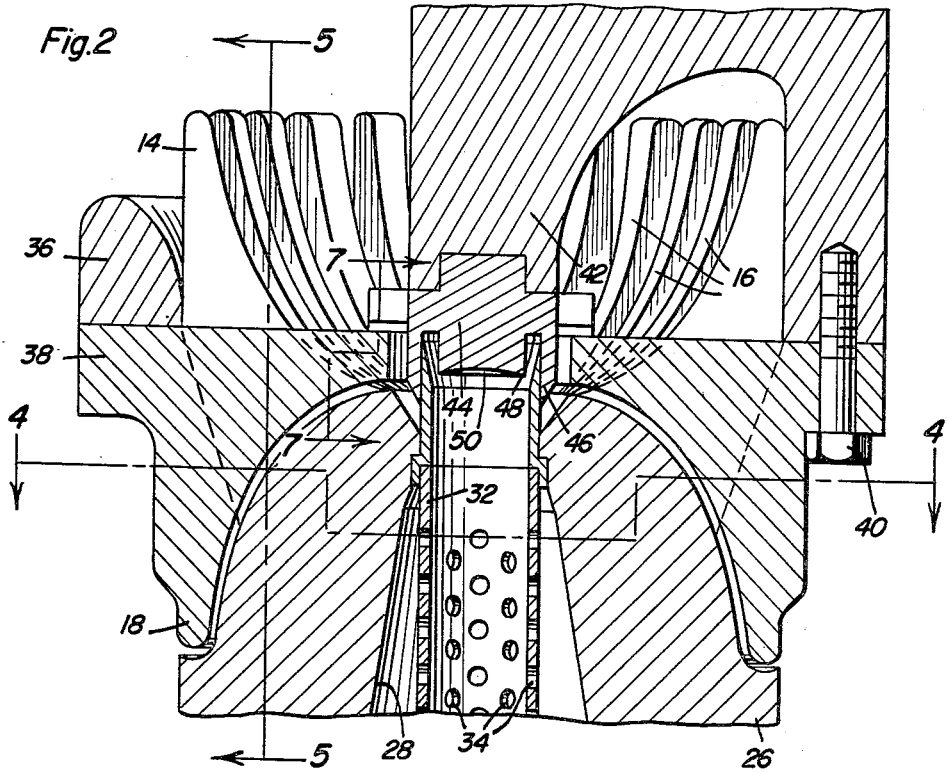
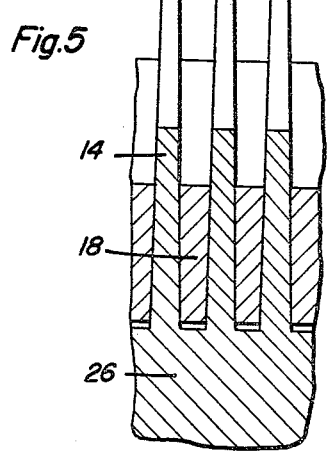
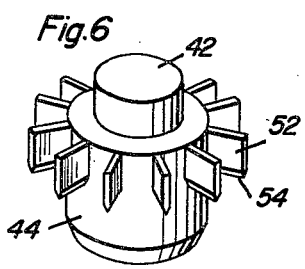
Ralph W. Cook
INVENTOR.

Sept. 11, 1962 R. W. COOK 3,053,170
CITRUS FRUIT PEEL SHREDDER
Filed Nov. 17, 1960 3 Sheets-Sheet 3
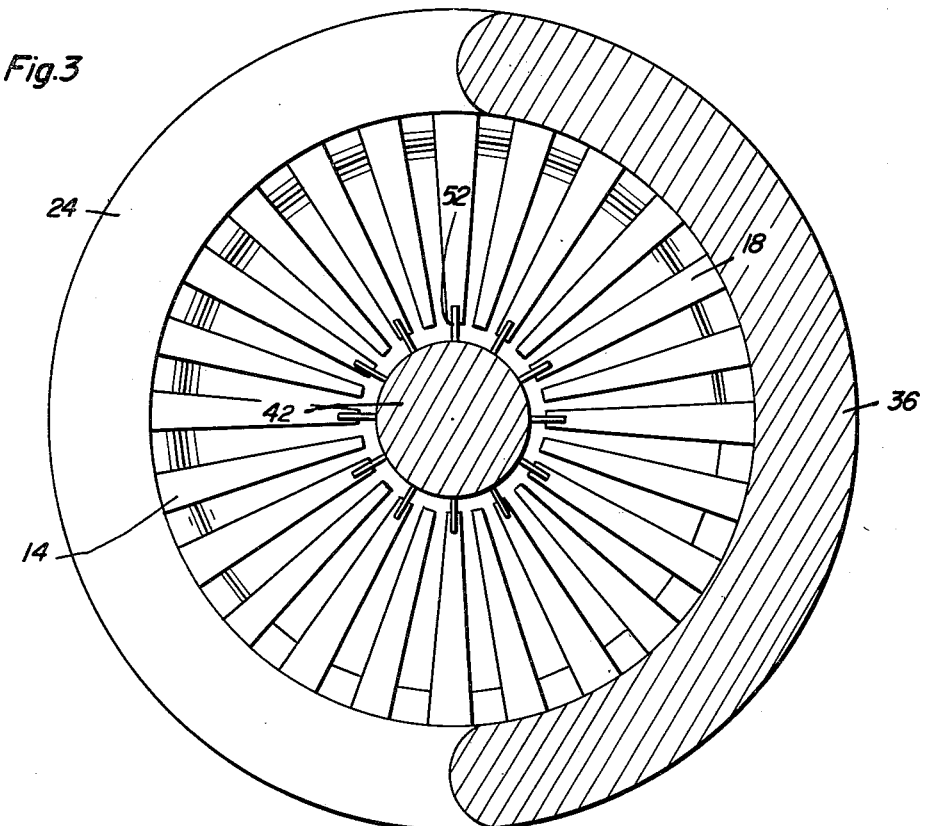
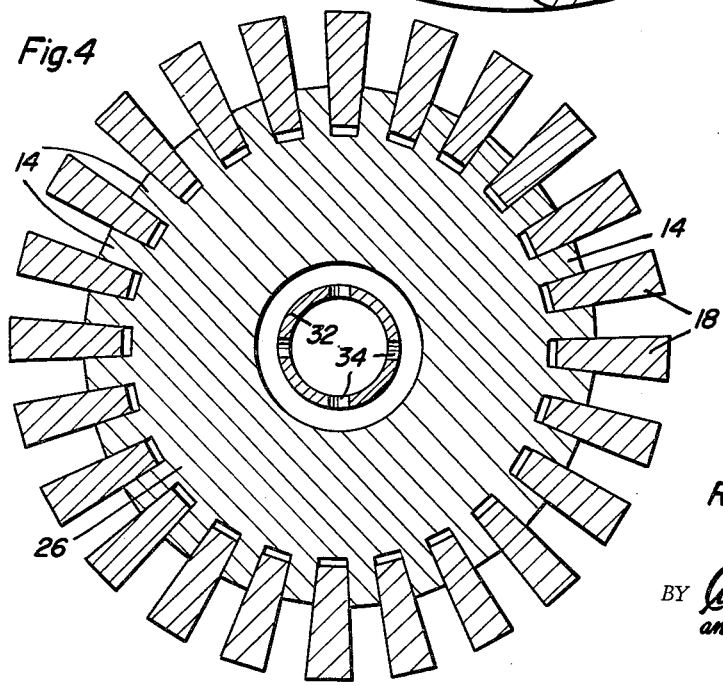
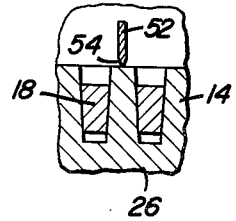
Ralph W. Cook
INVENTOR.

United States Patent Office 3,053,170
Patented Sept. 11, 1962

3,053,170
CITRUS FRUIT PEEL SHREDDER
Ralph W. Cook, 311 Main St., Dunedin, Fla.
Filed Nov. 17, 1960, Ser. No. 69,998
3 Claims. (Cl. 100—98)

This invention relates to an improvement in machines which extract juice from whole citrus fruits or the like which improvement relates to the shredding of the fruit peel or rind ejected from the machine.

The present invention is related to juice extracting machines of the type disclosed in Patent No. 2,649,730, of August 25, 1953. The aforesaid patent discloses a machine which includes a pair of cups between which the fruit from which the juice is to be extracted is received. One of the cups is stationary while the other cup is axially movable toward the stationary cup to thereby compress a fruit disposed within the stationary cup for purposes of extracting the juice therefrom. The upper end of a juice conducting conduit is therefore disposed centrally with respect to the stationary cup and projects partially into the cup for piercing the fruit disposed therein. The movable cup when compressing the fruit causes the juice thereof to flow downwardly through the juice conducting conduit. The cups are therefore defined by a plurality of fingers, the fingers of one cup interdigitating with the fingers of the other cup in order to completely collapse the fruit therebetween. Accordingly upon complete collapse of the fruit necessary to squeeze all of the juice out therefrom, the fruit peel or rind is squeezed into an opening formed in one of the cup mechanisms whereby the rind or peel is ejected from the machine. The fruit rind ejected from machines of the type disclosed in the aforesaid patent is collected for further processing to convert it into cattle food or some other useful by-product. The peel as it comes from the machine is however not satisfactory for being directly converted into cattle feed (a process involving adding lime to the peel and drying it). The peel as it comes from the machine contains pieces or chips which are much below the desired size. It also contains some pieces comprising practically a whole orange peel, and these are far too large to be processed into cattle feed. The sizing operation necessary to reduce the large size peel pieces results in a finished product which contains those small pieces ejected by the juice machine as well as undersized pieces produced by the chopper or shredder in the sizing operation. The finished product then includes some pieces of the desired size, and a larger amount of pieces below the desired size. Therefore, there are two reasons for the usefulness of this invention. One is to avoid the expense of an additional chopping or grinding step. The other is to avoid the production of more undersized pieces which is a natural consequence of all the presently known grinding methods. The knife blades mentioned in the aforesaid patent are incapable of shredding the peel as this invention teaches and were not put there for that purpose. It is stated in the aforesaid patent that the purpose of the knife blades mentioned is to cut the peel as necessary to enable it to be removed from the machine. Therefore, while the juice extracting machine disclosed in the aforesaid patent includes knife blades fixedly mounted with respect to one of the cups, said knife blades are so disposed both with respect to the interdigitating fingers of the cups and as to numbers, rendering them incapable of shredding or performing the purposes and objectives of this invention. The aforementianed knife blades of the juice extracting machine in the aforementioned patent are provided solely for the purpose of cutting the peel to enable removal thereof from the cup mechanisms.

It is therefore a primary object of this invention to provide a juice extractor machine with shredding mechanism for effectively reducing the ejected peel from the machine to a uniformly sized mixture suitable for processing into cattle feed without any further size reduction nor expense incident thereto.

An additional object of this invention is to provide a shredder mechanism for juice extracting machines which includes a plurality of knife blades fixed with respect to the fingers of one of the cup mechanisms of the juice extractor and in axial alignment with the interdigitating fingers of the other cup mechanism for cooperation therewith to shred the fruit peel squeezed past the shredding knife blades.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 2 is a sectional view of the cup mechanisms illustrated in FIGURE 1 in their collapsed positions.

FIGURE 3 is a sectional view taken through a plane indicated by section line 3—3 in FIGURE 1.

FIGURE 4 is a sectional view taken through section line 4—4 in FIGURE 2.

FIGURE 5 is a sectional view taken through a plane indicated by section line 5—5 in FIGURE 2.

FIGURE 6 is a perspective view illustrating the mounting of the shredder knife blades on the top plug cutter.

FIGURE 7 is a sectional view taken substantially through a plane indicated by section line 7—7 in FIGURE 2.

Figure 1:
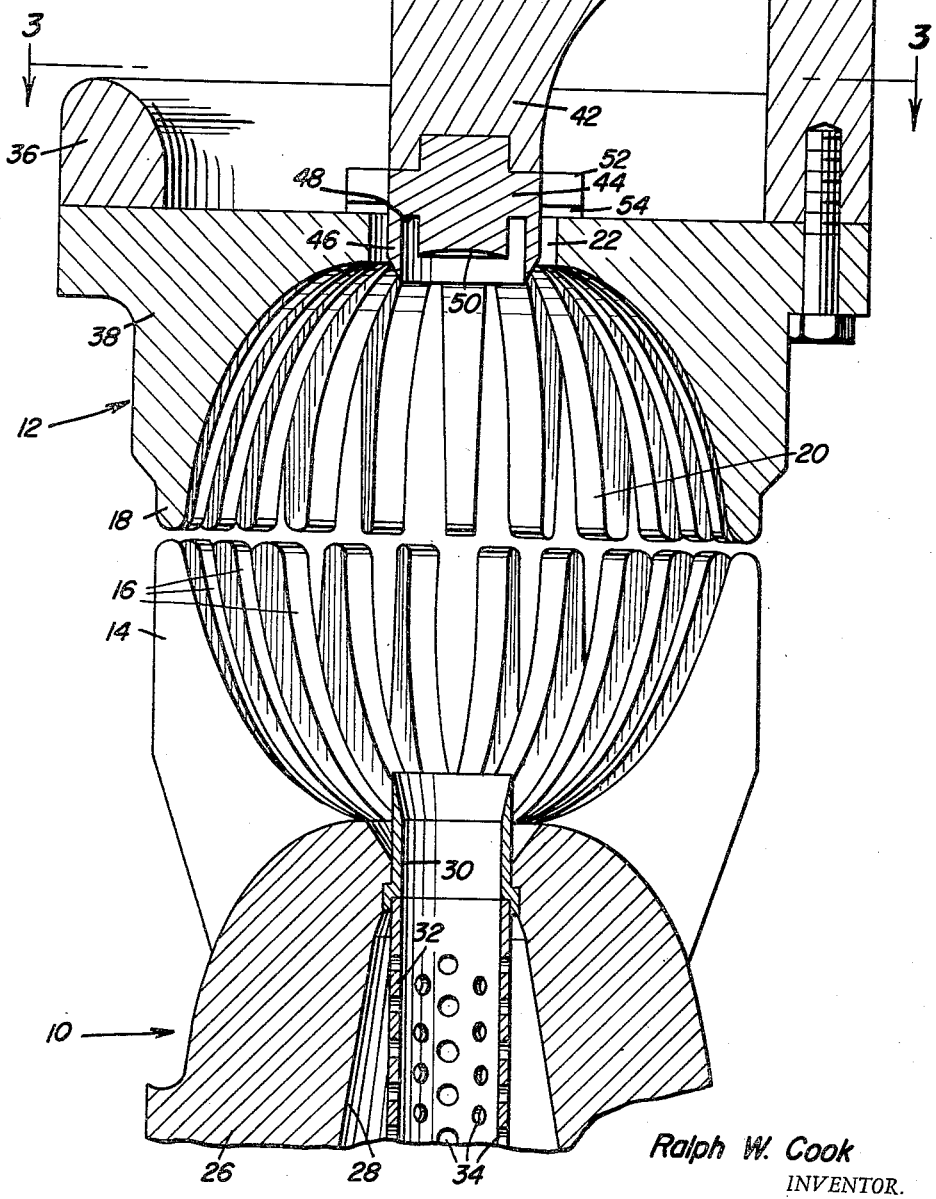
FIGURE 1 is a sectional view taken through a coacting pair of cup mechanisms of a juice extracting machine including the shredder device of this invention, the cup mechanisms being illustrated in extended position relative to each other.

Referring now to the drawings in detail, FIGURE 1 illustrates a portion of a juice extracting machine of the type disclosed in the aforementioned Patent No. 2,649,730. It will be observed in FIGURE 1, that there is provided a stationary cup mechanism generally indicated by reference numeral 10 which coacts with a movable cup mechanism generally indicated by reference numeral 12. It will further be observed that the cup mechanism 10 includes a plurality of fingers 14 which define a substantially hemispherical shaped cup by the radial inner surfaces 16 thereof. A citrus type of fruit may therefore be placed within the stationary cup mechanism 10 by suitable mechanism such as that disclosed in the aforesaid patent. The cup mechanism 12 is then brought downwardly over the fruit disposed within the stationary cup mechanism 10 in order to compress the fruit therein for extracting the juice therefrom. The cup mechanism 12 accordingly also includes a plurality of fingers 18 similar to fingers 14 also having inner surfaces 20 which define an upper cup. It will also be noted that the fingers 12 and 18 may be interdigitated or moved between each other so that the cup mechanisms 10 and 12 may move axially toward each other from the position illustrated in FIGURE 1 in order to compress the fruit disposed therebetween in order to completely collapse the fruit for extracting all of the juice therefrom. Attention is therefore now invited toward FIGURE 2 wherein it will be observed the cup mechanisms have moved to their axially inner positions relative to each other so that none of the fruit previously disposed between the cups would remain. It will therefore be observed from FIGURES 1 and 2 that the fruit rind or peel will be forced by the fingers 14 through the fingers 18 in a radially inner and axially upward direction into annular opening 22 formed within the cup mechanism 12 from which the peel may be ejected out of one side of the machine through a circumferentially disposed discharge opening 24 in the cup mechanism 12.

The bottom stationary cup mechanism 10 includes a solid body member 26 forming inwardly thereof a conical diverging passage 28 through which the extracted juice is conducted for retrieval purposes. The upper portion of the body member 26 which is stationarily mounted by the juice extractor machine has projecting therefrom the plurality of fingers 14. Also centrally disposed within the member 26 is a bottom tube cutter 30 which projects upwardly beyond the base of the fingers 14 and into the cup formation defined by the surface 16 thereof. Accordingly, a fruit disposed within the cup mechanism 10 and supported on the finger surfaces 16 will be pierced by the tube cutter 30 so that the conduit 32 connected to the tube cutter 30 will be in communication with the inside of the fruit. Accordingly, upon compression of the fruit between the cup mechanisms, juice will be squeezed down into the conduit 32. Apertures 34 are therefore provided in the conduit 32 whereby the juice received within the conduit 32 will pass through the apertures 34 into the passage 28 leaving behind the pulpy matter.

The cup mechanism 12 mounts the fingers 18 by means of an annular wall 36 forming the discharge opening 24 in one side as seen in FIGURE 3. Annular finger mounting member 38 is connected to the wall 36 by a plurality of bolt members 40. Projecting radially inwardly from the member 38 are the fingers 18. The cup mechanism 12 also includes a central portion 42 integral with the annular outer portion 36 defining a passage communicating with the opening 22 and the discharge opening 24. Accordingly, the fruit peel or rind will be forced through the opening 22 and ejected through opening 24 upon axial movement of the cup mechanism 12 downwardly toward the inner position thereof relative to the stationary cup mechanism 10 as illustrated in FIGURE 2. Suitable actuating mechanism is therefore connected to the cup mechanism 12 as disclosed in the aforesaid Patent No. 2,649,730. It will also be observed that fixed to the central portion 42 of the cup mechanism 12 is a top plug cutter member 44 which projects into the cup defined by the inner surfaces 20 of the fingers 18. Accordingly the top plug cutter 44 includes an annular knife portion 46 which pierces the top of the fruit when the cup mechanism 12 begins compressing the fruit into the stationary cup mechanism 10. Also formed within the member 44 is an annular slot 48 which receives the end of the cutter tube 30 when the cup mechanisms are in the positions illustrated in FIGURE 2. The inner surface 50 of the member 44 therefore pushes a plug of rind into the cutter tube 30 for purposes explained in detail in the aforesaid patent but with which the present invention is not concerned.

From the foregoing description, it will be apparent that the fruit peel will be squeezed into the annular opening 22 as the cup mechanism 12 is brought downwardly into the stationary cup mechanism 10. Accordingly in order to accomplish the objectives of this invention it will be necessary to shred the rind as it moved through the passage formed between the opening 22 and the discharge opening 24. Therefore, it will be observed from FIGURE 6 in particular that a plurality of knife blades 52 are connected as by welding to the upper portion of the member 44 fixed to the cup mechanism 12 said knife blades including a beveled knife edge 54 at the lower end thereof. It will be observed from FIGURES 1 and 2, that the knife blades project across the opening 22 within the passage formed rearwardly of the fingers 18 of the cup mechanism 12 so that the first peel must pass by the knife blades 52 and be completely severed. In so moving past the knife blades 52, the peel is shredded inasmuch as the knife blades 52 are sufficient in number to be relatively closely spaced whereby the peel is cut into narrow strips. It will also be observed from FIGURE 7 in particular that the knife edges 54 of the knife blades 52 are axially aligned with the fingers 14 with respect to which the knife blades 52 and the cup mechanism 12 move. Accordingly, the fingers 14 which must push or squeeze the peel between the fingers 18 interdigitated therewith, cause the peel to be moved directly into the knife edges 54 of the blades 52 for effective cutting thereof with a minimum of compression of the peel by the blades. It will be of course appreciated that the knife blades may be mounted on either of the cup mechanisms in which case the passage for the peel will be disposed in said cup mechanism behind the knife blades. Also, it will be appreciated that the knife blades and peel ejecting passages may be held stationary while the other cup mechanism is movable with respect thereto.

From the foregoing description, operation and utility of the shredder device of this invention will be apparent. It will therefore be appreciated that the shredder device of this invention renders juice extracting machines heretofore used much more profitable by virtue of the fact that the expense of additional shredding of the by-product fruit peel or rind is eliminated by practice of the present invention resulting in an improved cattle feed after further processing of the shredded peel.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a juice extractor having a pair of confronting cups each formed by rind receiving surfaces on a plurality of closely spaced elongated fingers of narrow segmental width as compared to a continuous annular surface formed by interdigitating said fingers upon axial movement of the confronting cups toward each other to squeeze and collapse a fruit rind therebetween for discharge through a passage formed axially behind one of said cups; a rind shredder device comprising a relatively large number of equally spaced knife blades fixed with respect to the fingers of said one cup and extending in closely spaced relationship across said passage, each of said knife blades being in alignment with one of said fingers of said other cup of said pair of cups for shredding the rind compressed between the receiving surfaces of said interdigitating fingers into said passage to reduce the rind to a plurality of narrow rind shreds of uniformly reduced size upon ejection from the passage of the juice extractor.

2. The combination of claim 1, wherein said knife blades are disposed radially inward and axially spaced with respect to the fingers.

3. The combination of claim 2, wherein said one cup is axially movable downwardly toward the other cup which is stationary.

References Cited in the file of this patent

UNITED STATES PATENTS

| | | |
|---|---|---|
| 2,540,345 | Pipkin | Feb. 6, 1951 |
| 2,649,730 | Hait | Aug. 25, 1953 |
| 2,780,988 | Belk et al. | Feb. 12, 1957 |